US00RE38205E

(19) United States
(12) Reissued Patent
Loughlin et al.

(10) Patent Number: US RE38,205 E
(45) Date of Reissued Patent: Jul. 29, 2003

(54) VARIABLE ATTENUATOR CONNECTOR

(75) Inventors: John P. Loughlin, Lebanon, NJ (US); Ronald Joseph Vecchio, Morris Plains, NJ (US); Vladimir Sinisa Ban, Princeton, NJ (US); Cuneyt Erdogan, Franklin Park, NJ (US)

(73) Assignees: Johanson Manufacturing Corporation, Boonton, NJ (US); PD-LD Incorporated, Princeton, NJ (US)

(21) Appl. No.: 09/177,910

(22) Filed: Oct. 23, 1998

Related U.S. Patent Documents

Reissue of:
(64) Patent No.: 5,734,778
Issued: Mar. 31, 1998
Appl. No.: 08/695,546
Filed: Aug. 12, 1996

U.S. Applications:

(63) Continuation of application No. 08/336,745, filed on Nov. 3, 1994, now abandoned.

(51) Int. Cl.[7] ..... G02B 6/38
(52) U.S. Cl. ..... 385/140; 385/60; 385/72; 385/73
(58) Field of Search ..... 385/60, 72, 73, 385/140

(56) References Cited

U.S. PATENT DOCUMENTS 5,050,956 A * 9/1991 Carpenter et al. ..... 385/140
5,066,094 A * 11/1991 Takahashi ..... 385/140 X
5,136,681 A * 8/1992 Takahashi ..... 385/140
5,187,768 A * 2/1993 Ott et al. ..... 385/140

* cited by examiner

*Primary Examiner*—Phan T. H. Palmer
(74) *Attorney, Agent, or Firm*—Morgan & Finnegan LLP

(57) ABSTRACT

The disclosure describes a connector for fiber optic transmission cables, incorporating into it a variable attenuator. The variable attenuation is achieved by having a screw arrangement vary an air gap, and additional embodiments of the invention feature ways of fixing the attenuation at a given level and of minimizing back-reflection.

81 Claims, 10 Drawing Sheets

| ATTENUATION TESTING FOR 100 TPI DIALYTE WITH SINGLE MODE FIBER | | | | | | |
|---|---|---|---|---|---|---|
| TURNS | RUN 11 | RUN 12 | RUN 13 | RUN 14 | | |
| 0 | −0.04 | −0.07 | −0.04 | −0.12 | | |
| 0.25 | −3.62 | −4 | −1.88 | −2.2 | | |
| 0.5 | −8.45 | −7.25 | −8.33 | −7.17 | | |
| 0.75 | −12.12 | −11.93 | −11.17 | −11.09 | | |
| 1 | −15.42 | −15.26 | −14.02 | −13.5 | | |
| 1.25 | −17.74 | −17.63 | −16.81 | −16.15 | | |
| 1.5 | −19.59 | −19.49 | −19.35 | −17.88 | | |
| 1.75 | −20.89 | −20.97 | −20.74 | −19.62 | | |
| 2 | −22.09 | −22.18 | −21.86 | −20.92 | | |
| 2.25 | −23.37 | −23.86 | −22.72 | −22.25 | | |
| 2.5 | −24.48 | −24.92 | −23.7 | −23.32 | | |
| 2.75 | −25.52 | −25.85 | −24.48 | −24.14 | | |
| 3 | −26.39 | −26.6 | −25.15 | −25.29 | | |
| 3.25 | −27.36 | −27.36 | −25.71 | −25.71 | | |

| ATTENUATION TESTING FOR 200 TPI DIALYTE WITH SINGLE MODE FIBER | | | | | | |
|---|---|---|---|---|---|---|
| TURNS | RUN 11 | RUN 12 | RUN 13 | RUN 14 | | |
| 0 | 0 | −0.02 | −0.03 | −0.03 | | |
| 1 | −3.29 | −3.08 | −3.03 | −3.02 | | |
| 2 | −6.8 | −6.56 | −6.67 | −6.54 | | |
| 3 | −9.66 | −9.5 | −9.4 | −9.5 | | |
| 4 | −11.82 | −11.61 | −11.59 | −11.6 | | |
| 5 | −13.43 | −13.39 | −13.33 | −13.37 | | |
| 6 | 14.87 | −14.87 | −14.94 | −14.88 | | |
| 7 | −16.26 | −16.17 | −16.24 | −16.15 | | |
| 8 | −17.39 | −17.39 | −17.25 | −17.3 | | |
| 9 | −18.32 | −18.38 | −18.34 | −18.34 | | |
| 10 | −19.32 | −19.32 | −19.37 | −19.35 | | |
| 11 | −20.24 | −20.2 | −20.04 | −20.22 | | |
| 12 | −21.07 | −21.07 | −21.04 | −21.08 | | |
| 13 | −21.82 | −21.87 | −21.87 | −21.88 | | |

VARIABLE ATTENUATOR CONNECTOR

Matter enclosed in heavy brackets [ ] appears in the original patent but forms no part of this reissue specification; matter printed in italics indicates the additions made by reissue.

This application is a continuation of application Ser. No. 08/336,745, filed on Nov. 3, 1994, now [abandonment] *abandoned.*

BACKGROUND OF THE INVENTION

Among the most important components of fiber optic transmission systems are connectors and attenuators.

The chief function of a fiber optic connector is to assure a low-loss connection between optical fiber ends and/or between optical fibers and other components of a fiber optic system, such as optical sources (lasers and LEDs), optical receivers (PIN or APD diodes) etc. There are many versions of fiber optic connectors, known as ST®[1], SC, FC, biconic etc.

[1]ST is a registered trademark of AT&T

The chief function of an attenuator is to regulate the strength of an optical signal in the transmission system. It is desirable to maintain the strength of an optical signal within a certain range to avoid receiver saturation, or to compensate for variable distances of various receivers from the source or to compensate for aging or other changes in the system.

There are several kinds of attenuators on the market. They can provide either variable or fixed attenuation over a wide range of signal strength.

Another important aspect of fiber optic transmission systems is the control of optical back-reflections. As an optical signal propagates through the fiber, it passes through a series of interfaces (e.g., between two connectors) which cause a certain portion of the signal to reflect back toward its source. Such back-reflections cause undesirable interference with a signal and thus must be minimized. This is particularly important for high-speed transmission systems and analog signal transmission systems, such as cable TV. There are several methods which are employed to control back-reflections, e.g., optical isolators angle polished connectors, anti-reflection coatings etc.

This invention describes a device called a variable attenuation connector (VAC), which simultaneously addresses all of the above described requirements of a fiber optic transmission system, i.e., a VAC provides connectivity, regulates attenuation and controls back-reflection.

The VAC is a very important development for economic as well as technical reasons. In order to cover all of the functions of a VAC one has to employ a variable attenuator connected by a fiber to the connector. One thus deals with three fiber terminations, i.e., termination at the entry into the attenuator, termination at the exit of the attenuator and the termination of the connector itself. With a VAC only one termination is needed, that of the VAC itself. Elimination of two terminations is a major economic advantage, since terminations cost about $10 each.

A second major savings is in the cost of components. Variable attenuators with characteristics comparable to VAC sell for over $150 in quantities of one hundred or so, while connectors cost about $10–$20 each. The cost of a VAC will be significantly below $100, thus one saves about $100 per attenuator by using a VAC.

The technical advantages of a VAC are also significant. In the so called fiber-in-the-loop networks, which make up the fastest-growing segment of fiber optic markets, it is very important that all receivers in the loop receive similar levels of light signals. This is difficult to achieve since some receivers are closer to sources than others, these will then receive a considerably stronger signal. A VAC will enable cable installers to adjust the strength of the signal for each receiver by simply measuring the incoming signal at the given location and then setting the attenuation at the desirable level.

Also important is the convenience of adjustment at the connector itself. By turning the knurled nut one basically opens and closes the "light faucet" at the point of need, just as one regulates flow of water at the end of a pipe.

The VAC will thus find wide usage in fiber-in-the-loop systems.

SUMMARY OF INVENTION

A VAC is essentially a modified optical connector which permits linear motion of a fiber-containing ferrule to create an air gap between two mating connectors. The attenuation of the signal strength is proportional to the size of the air gap.

The linear motion which creates the gap is accomplished by a fine screw mechanism attached to the ferrule. The size of the gap is regulated by the number of turns of a knurled nut positioned at the rear of the VAC. In this way signal attenuation ranging from 0–40 db can be achieved.

The extent of back-reflection is regulated by the angle polishing of the ferrule face. Once the gap is created, the light is reflected at an angle, which makes it miss the core of the fiber polished at an angle. Thus, only a minute fraction of back-reflected light enters the fiber. Back-reflections below −50 db have been shown.

We have thus invented a device that performs multiple functions in fiber optic transmission systems, i.e., the VAC acts as a connector, a variable attenuator and it reduces back-reflections.

DETAILED DESCRIPTION OF VAC (ST®Version)

Figure 1:
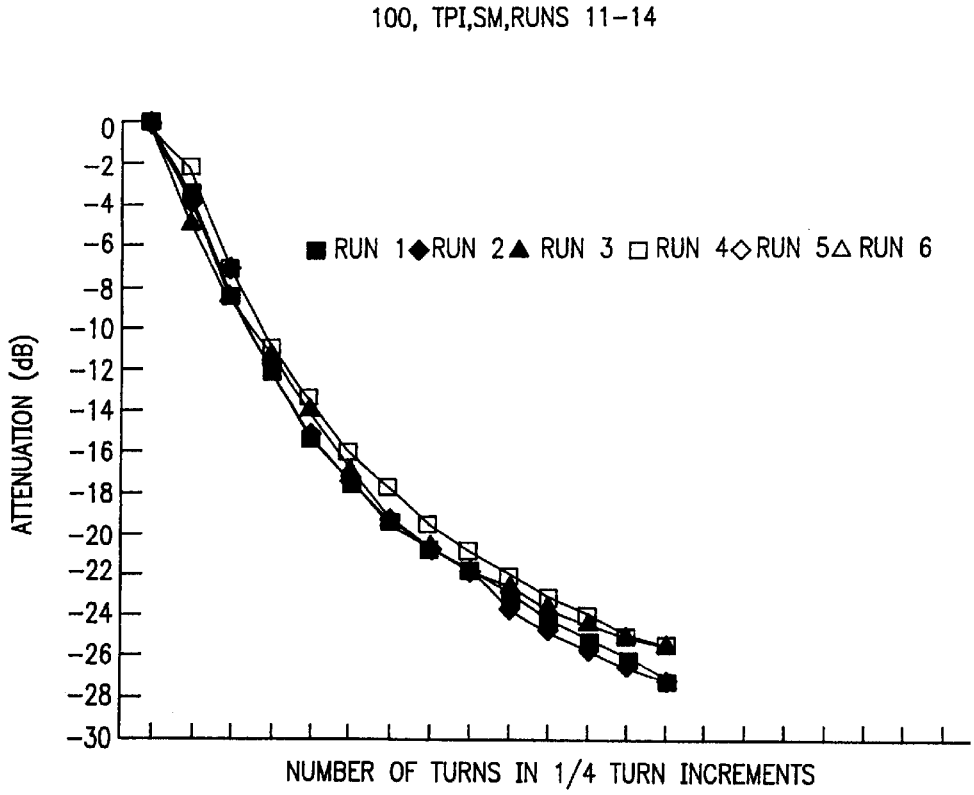
FIG. 1 shows the attenuation of an ST® compatible single mode VAC as a function of the number of ¼ turns of the knurled nut. Since in this case we used a fine screw with 100 threads per inch (TPI), one turn corresponds to an air gap increment of 254 micrometers. The graph shows that in approximately 3 turns the attenuation increased from 0 to over −25 db. Assuming that one can exercise control to 1/10 of a turn one can control attenuation to within ±0.25 db.
Figure 2:
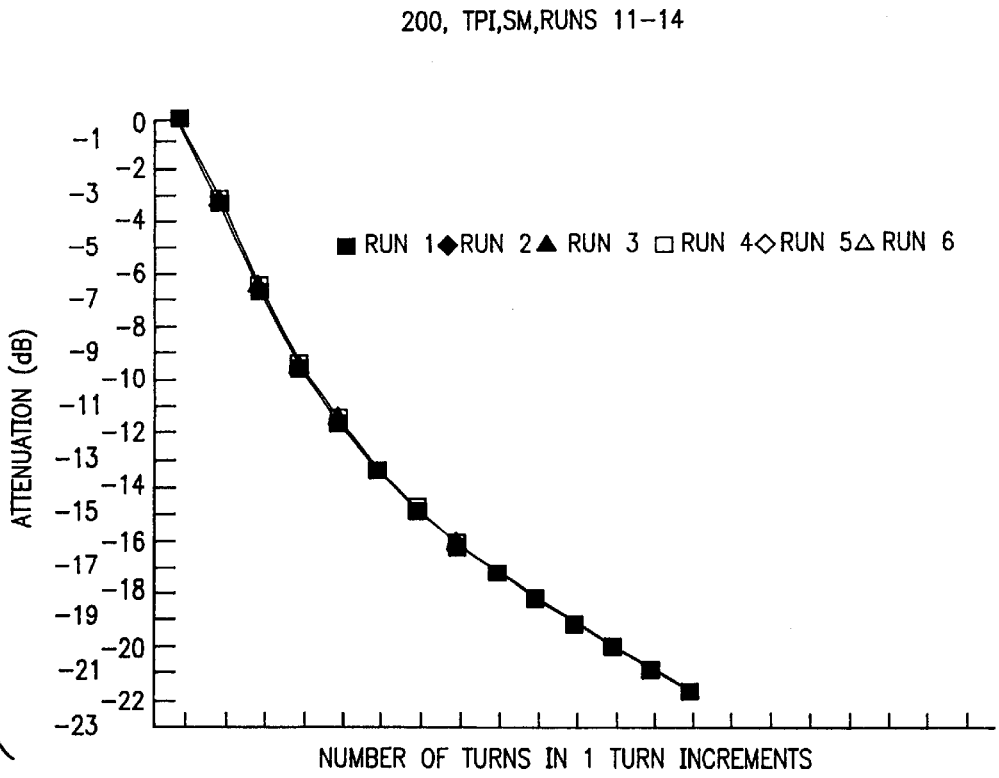
FIG. 2 shows attenuation of an ST® compatible single mode VAC fitted with a 200 TPI screw. In 13 turns the attenuation increased from about −0.03 db to −21.8 db. The resolution of attenuation in this case is better than ±0.1 db.
Figure 3:
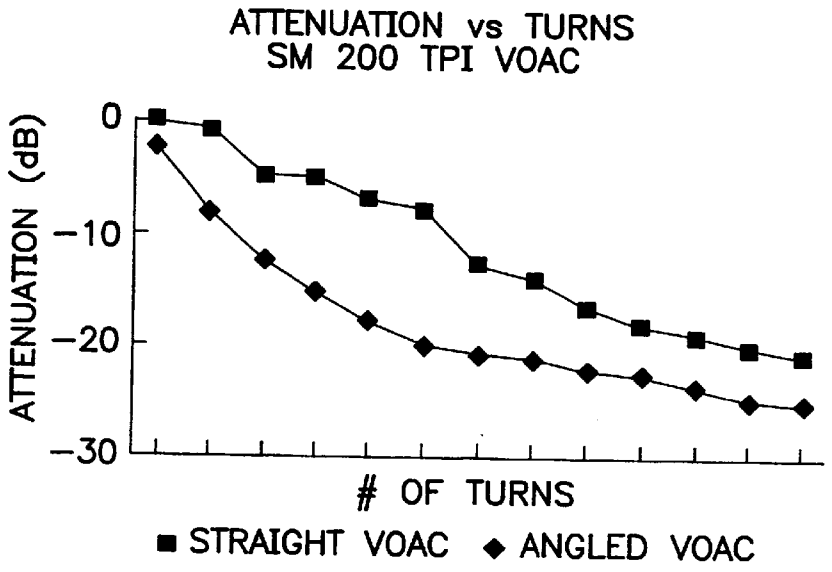
FIG. 3 shows the effect of angle polishing on attenuation. In 12 turns, a straight polished VAC achieved attenuation of −21.1 db and an angle polished VAC reached −25.2 db attenuation.
Figure 4:
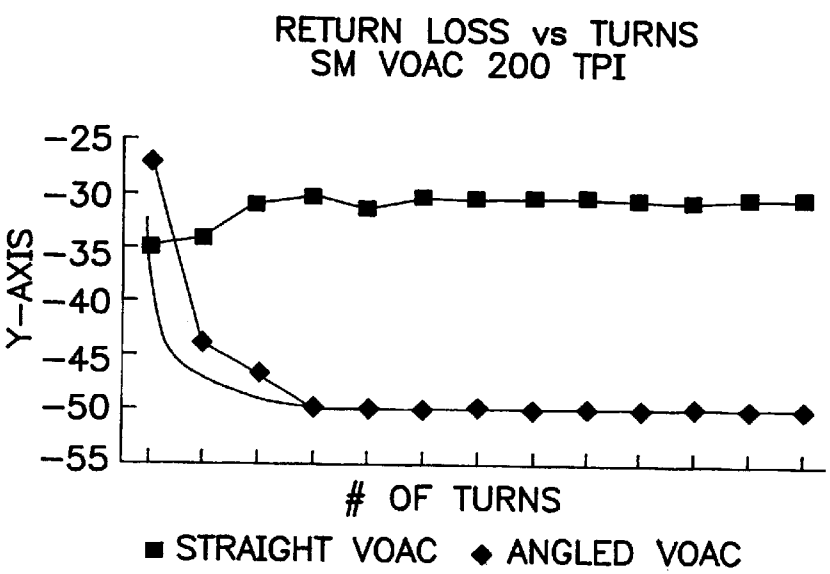
FIG. 4 shows the effect of angle polishing on the reduction of back-reflections. For a straight polished VAC back-reflection values of −30 db were achieved, while for an angle polished VAC values of −50 db were achieved.
Figure 5A:
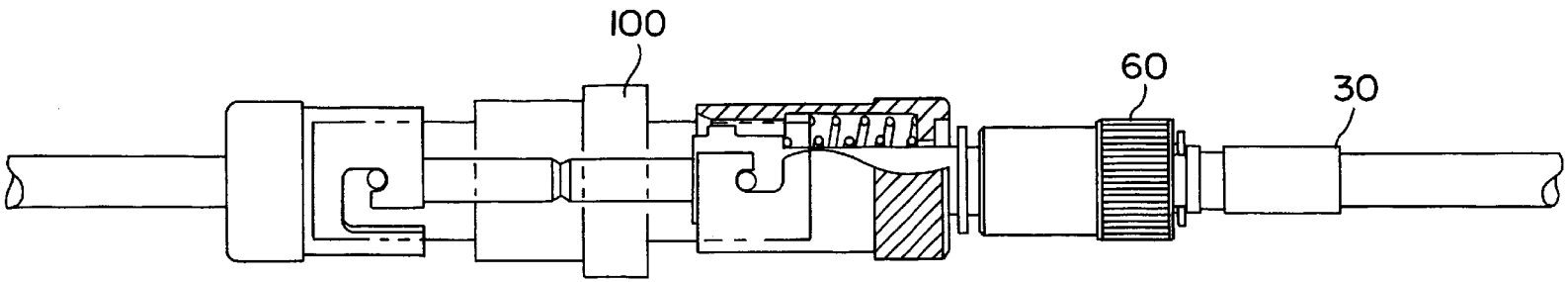
FIG. 5a is a partial cross section and shows the VAC fastened to a coupling device with no air gap introduced.
Figure 5B:
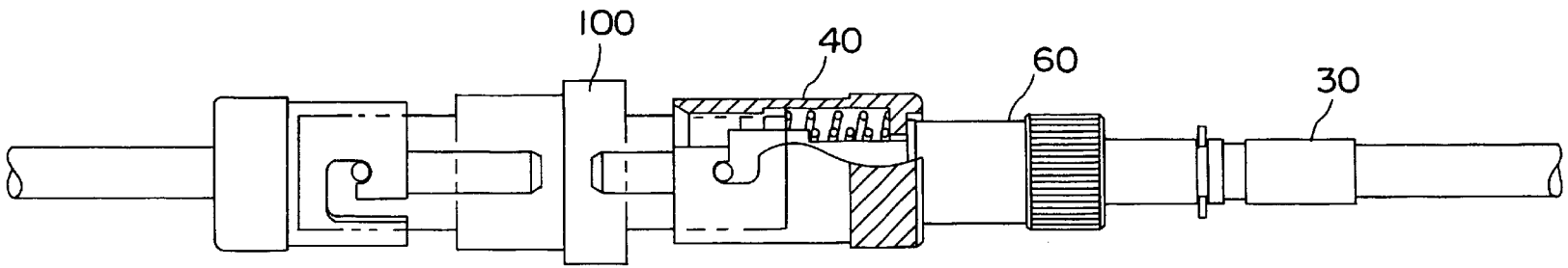
FIG. 5b is a partial cross section and shows the VAC fastened to a coupling device with an air gap introduced.
Figure 6:
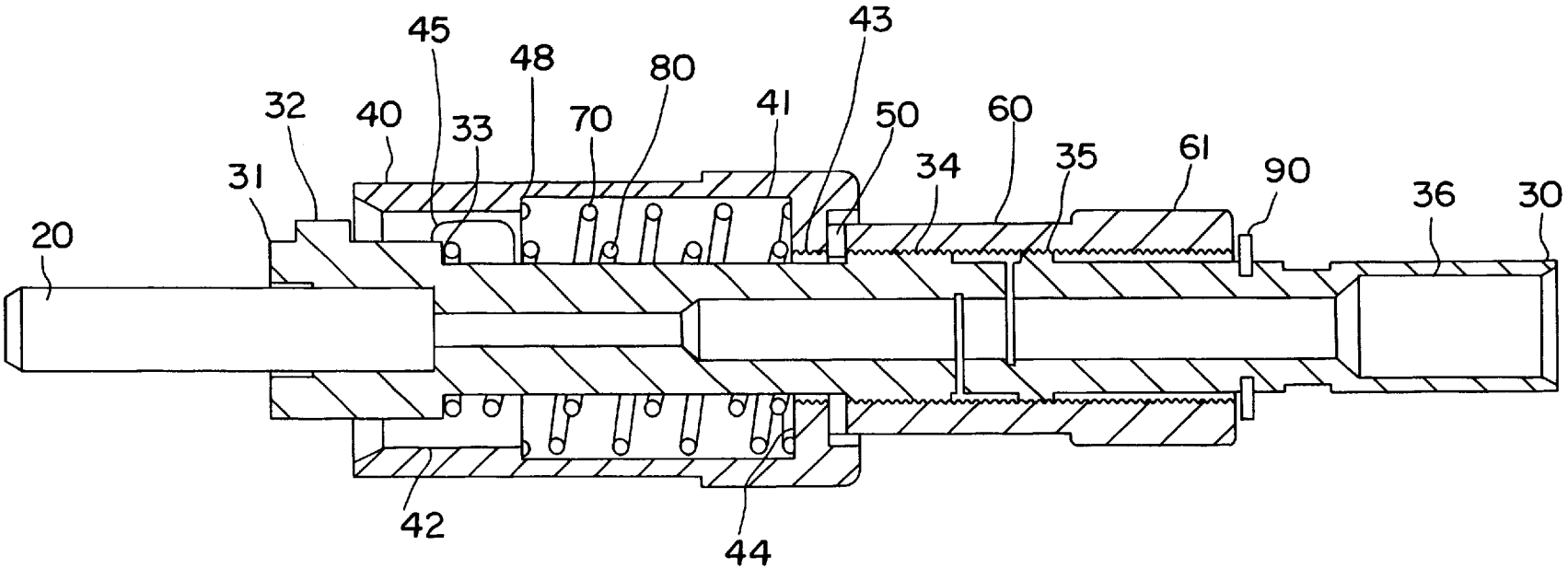
FIG. 6 is a partial section drawing and shows the VAC when not attached to a coupling device.
Figure 7:
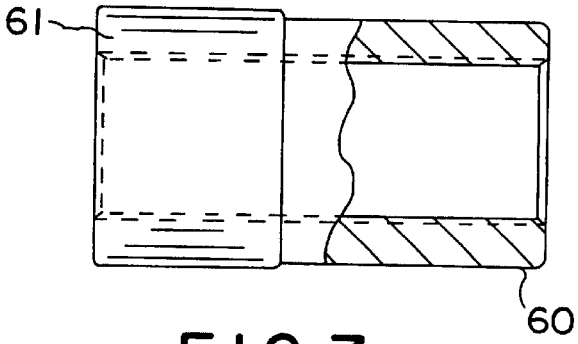
FIG. 7 is a detail of the adjusting nut.
Figure 8A:
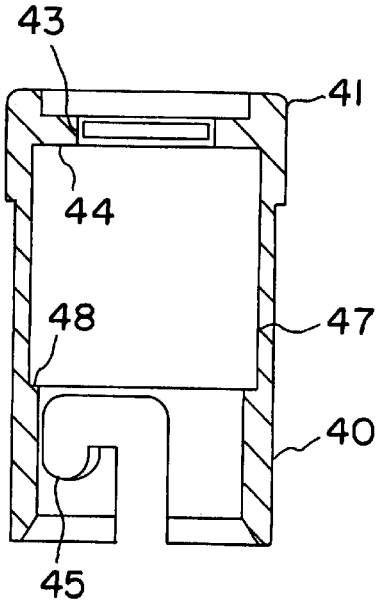
FIGS. 8a, 8b and 8c are details of the coupling nut.
Figure 8B:
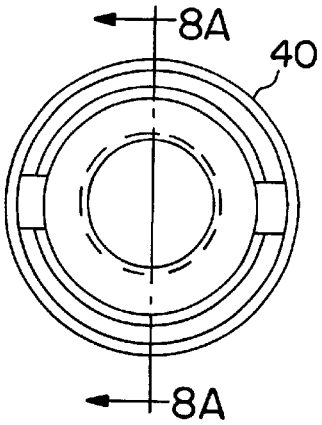
Figure 8C:
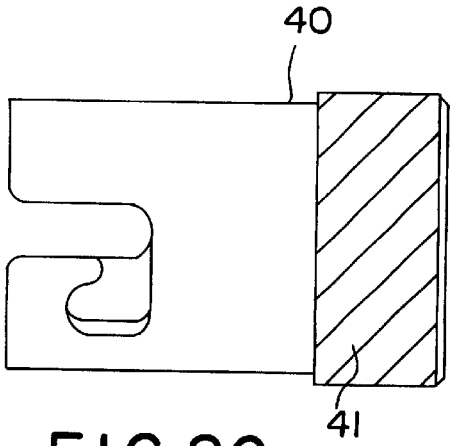
Figure 9A:
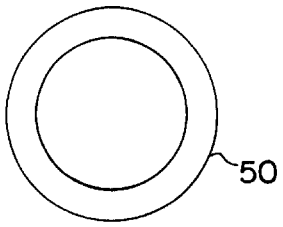
FIGS. 9a & 9b are details of the thrust washer.
Figure 9B:
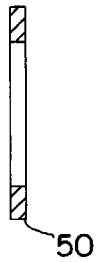
Figure 10A:
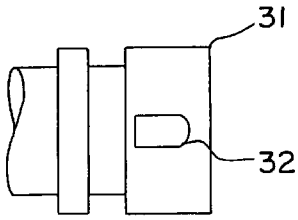
FIG. 10a & 10b are details of the ferrule body.
Figure 10B:
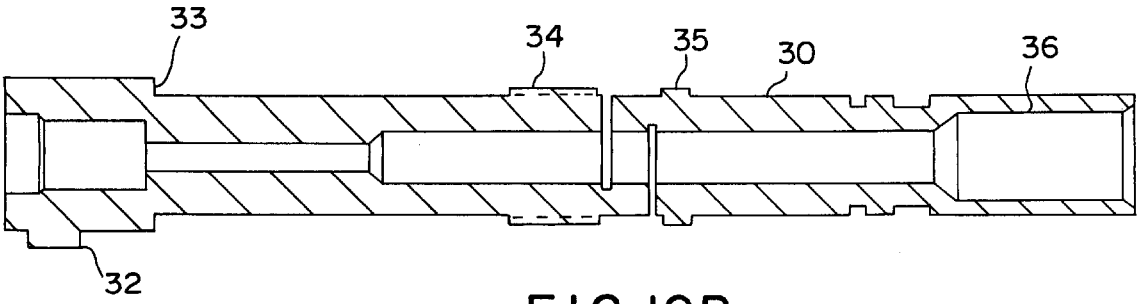
Figure 11A:
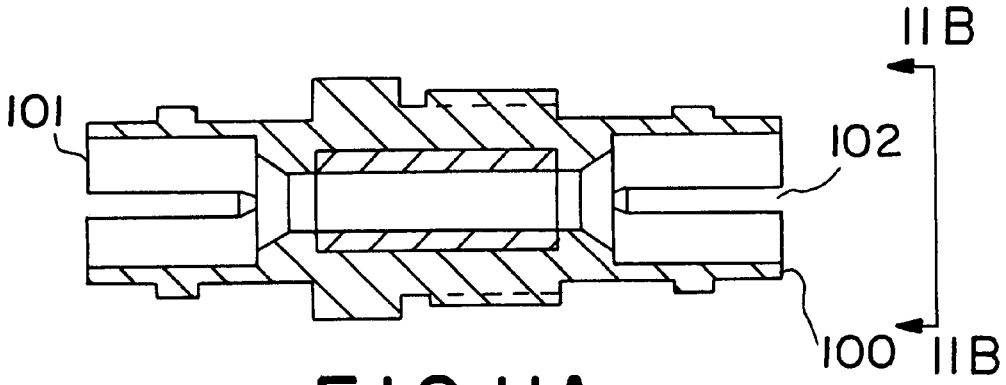
FIG. 11a–11h are details of coupling devices.
Figure 11B:
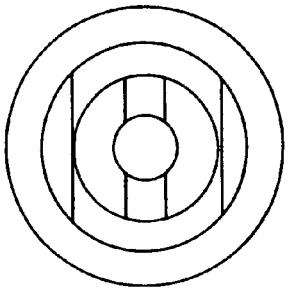
Figure 11C:
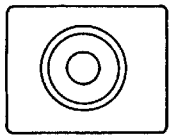
Figure 11D:
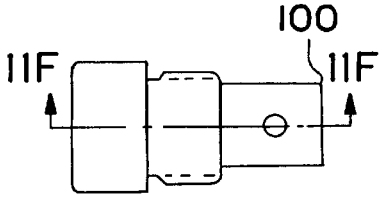
Figure 11E:
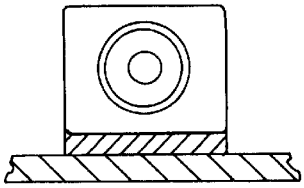
Figure 11F:
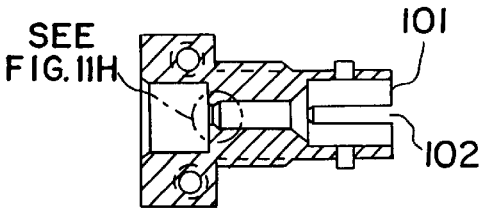
Figure 11G:
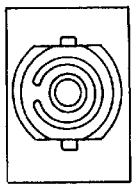
Figure 11H:
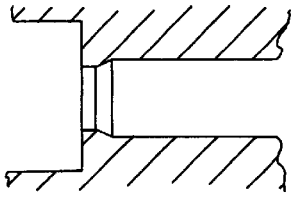
Figure 12A:
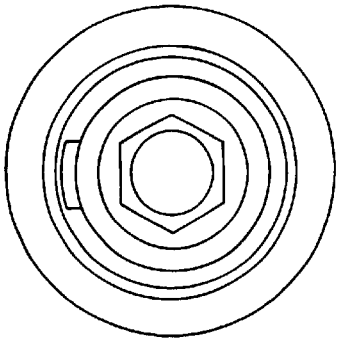
FIG. 12a & 12b are sectioned assembly drawing of an FC version of a VAC.
Figure 12B:
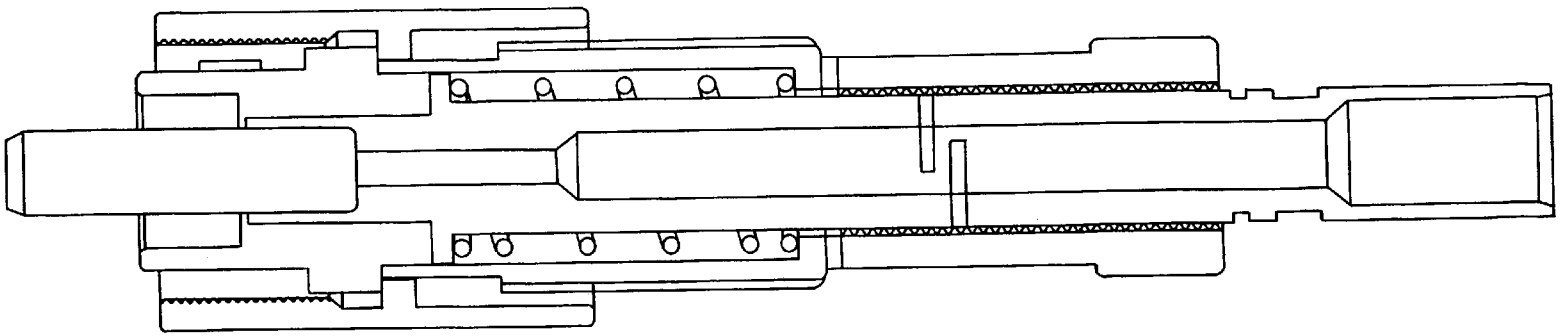

The ferrule 20 is pressed into a counter bore at the front end of the ferrule body 30. Optical alignment of the two mating fibers is dependent upon the extreme precision of the ferrule 20.

The ferrule body 30 has an enlarged outer diameter 31 at the front end. The dimension of this outer diameter is such that it provides a close fit with the inner diameter 101 of the mating coupling device 100. A key 32 protrudes radially outward from the enlarged outer diameter and is sized such that it fits into a slot 102 in the mating coupling device 100. This key provides a radial alignment and prevents the ferrule body 30 from rotating while engaged in the mating coupling device 100 and during attenuation adjustment. The shoulder 33 formed by the enlarged outer diameter and the main ferrule body 30 diameter provide a bearing surface for one end of the smaller compression spring 80.

The two threaded sections 34 & 35 on the ferrule body 30 are separated by tension slots. The tension slots are sized, positioned and compressed such that the desired tension between the two threaded sections is achieved when the knurled adjusting nut 60 is threaded on. This tension translates into a controlled torque between the knurled adjusting nut 60 and the ferrule body 30. A groove behind the second thread section on the ferrule body 30 accommodates a C-clip 90. A wider groove behind the C-clip groove provides a better purchase for an elastomeric strain relief. The internal diameters on the ferrule body 30 are dimensioned to accommodate commonly used fiber optic cables. A section 36 at the rear of the ferrule body 30 has the largest inner diameter and this section may be crimped to secure the fiber optic cable to the VAC.

On the forward section of the coupling nut 40 there is an enlarged inner diameter section 41, a shoulder 48 is formed by the enlarged inner diameter and the forward smaller inner diameter 42. This section is dimensioned such that it will positively contain the large compression spring 70. The large compression spring 70 with flat ground ends is sized and positioned such it will bear against the end of any standard ST® coupling device 100. A wall 44 with a small threaded hole 43 separates the front and rear internal sections of the coupling nut 40. The hole is threaded to match the external threads on the ferrule body 30. The flat surface of the wall on the forward side provides a bearing surface for both the large and the small compression spring 80. The rear surface of the wall provides a bearing surface for the thrust washer 50. The two hook shaped keyways 45 on the front of the coupling nut 40 are sized and located such that the coupling nut 40 will mate with any standard ST® coupling device 100. A diagonally knurled external rear section 46 provides the operator with a positive and secure grip during the push and twist motion required during engagement and disengagement of the coupling nut 40.

The thrust washer 50 has two parallel flat surfaces and serves as a thrust bearing to reduce friction between the coupling nut 40 and the adjusting nut 60.

The adjusting nut 60 has a fine internal thread to match the external thread on the ferrule body 30 and this internal thread runs the entire length of the adjusting nut 60. On the rear end of the adjusting nut 60 there is a raised external knurl 61 to provide a positive grip for the operator.

A ferrule 20 is pressed into the ferrule body 30 and the small compression spring 80 is slid over the external threaded section of the ferrule body 30. A special tool may be employed to prevent damage to the threads during this assembly operation.

The large compression spring 70 has an outer diameter that is slightly larger than the inner diameter of the front section 47 of the coupling nut 40. The large spring 70 is pressed into the front section of the coupling nut 40 and the spring's diameter is initially reduced and then returns to its original size after it is completely pressed into the enlarged inner diameter section of the coupling nut 40.

The coupling nut 40 and large spring 70 assembly are attached to the ferrule body assembly by threading the coupling nut 40 over both thread sections on the ferrule body 30. This arrangement will contain the small spring 80 between the enlarged diameter on the front of the ferrule body 30 and the internal front wall on the coupling nut 40. This arrangement also minimizes the clearance between the small threaded hole 43 in the coupling nut 40 and the smooth diameter of the ferrule body 30. Removal of the coupling nut 40 from the ferrule body 30 can only be achieved by unthreading one from the other.

The thrust washer 50 is slid over both threaded sections on the ferrule body 30 and is located adjacent to the rear internal wall of the coupling nut 40.

The adjusting nut 60 is threaded onto the ferrule body 30 with the knurled section to the rear. The adjusting nut 60 is threaded up to a position such that its rear face is forward of the groove for the C-clip 90. Note that a lubricant may be applied to reduce friction between the coupling nut 40, thrust washer 50 and adjusting nut 60 and also between the adjusting nut's internal threads and the ferrule body's external threads.

A C-clip 90 is attached to the ferrule body 30 in the previously mentioned groove. The C-clip 90 serves as both a positive stop for the adjusting nut 60 as well as a reference stop for the crimp section.

A fiber optic cable is terminated in the VAC assembly using conventional means known to those experienced in the art. A strain relief may be employed at the rear of the terminated VAC assembly to protect the optical fiber from breakage due to sideways pulling of the cable.

We claim:

1. A variable attenuator connector for joining fiber optics cables comprising:

a ferrule body having a first end and an opposite end and an inner diameter and an outer diameter, said ferrule body having a counter bore at the first end having an enlarged diameter, said ferrule body further having external threads on a part of the outer diameter;

a ferrule pressed into said counter bore at the first end of the ferrule body;

means for providing radial alignment between a mating coupling device and the ferrule body, said means located on the first end of said ferrule body;

a coupling nut on the first end of the ferrule body adjacent said means for radial alignment, said coupling nut surrounding said ferrule body and having a first end and an opposite end and an inner diameter and an outer diameter said coupling nut further having an enlarged inner diameter section and a smaller inner diameter section, said coupling nut containing a small compression spring and a large compression spring, said coupling nut having a wall with a front and rear surface on the opposite end, said wall having a small threaded hole, said hole having threads which match the threads on the ferrule body, whereby the large spring is contained in the enlarged inner diameter section and bears against the coupling device and the front surface of the wall provides a bearing surface for the large and small spring;

a thrust washer having a first and second side, said first side of the thrust washer located adjacent to the rear surface of the wall on the opposite end of said coupling nut;

an adjusting nut adjacent to the second side of the thrust washer, said adjusting nut surrounding said ferrule body and having a first and opposite end and an inner and outer diameter, said adjusting nut having threads along the inner diameter and means for an operator to grip the adjusting nut; and a stop located adjacent the opposite end of the adjusting nut;

wherein the part of the outer diameter of the ferrule body having threads is located adjacent to the threads on the inner diameter of the adjusting nut and the threads on the wall of the coupling unit.

2. The variable attenuator connector of claim 1, wherein the means for providing radial alignment comprises a key which protrudes radially outward from the front end of said ferrule body.

*3. A fiber optic connector, comprising:*

*a standard quick-connect coupling nut with features to engage and affix mating features of a coupler of an optical component, said coupling nut containing a small compression spring and a large compression spring;*

*a cable mounting structure designed to retain a ferrule to an end of a fiber optic cable, the cable mounting structure and ferrule together designed to retain the cable end in an optical alignment with the optical component, the end of the ferrule being beveled from a plane perpendicular to an alignment axis;*

*a threaded member, stably axially coupled to the cable mounting structure and ferrule; and*

*an adjuster threaded with the threaded member and in an essentially driftless axial coupling with the coupling nut, the adjuster adapted to calibrate a distance between the cable mounting structure and the optical component by adjusting an axial position of the cable mounting structure relative to the coupling nut by relative rotation of the adjuster and the threaded member, the distance being calibratable while an optical connection between the optical component and the cable remains intact, without substantial disassembly of the connector.*

*4. The connector of claim 3, wherein the large compression spring is arranged in opposition between the cable mounting structure and the coupling nut to reduce drift of the cable mounting structure relative to the optical component.*

*5. The connector of claim 3, wherein the threaded member and adjuster are mated at at least 200 threads to the inch.*

*6. The connector of claim 3, further comprising a key protruding from the cable mounting structure for engagement with an anti-twist slot, arranged to control twist in the fiber optic cable during relative rotation of the adjuster and threaded member.*

*7. A connector, comprising:*

*a component mounting structure designed to affix an optical component, said component mounting structure containing a small compression spring and a large compression spring;*

*a cable mounting structure designed to retain an end of a fiber optic cable in an optical alignment with the optical component; and*

*male and female threaded members rotatably mated to adjust a distance between the cable mounting structure and the optical component by relative rotation of the threaded members, the distance being calibratable while an optical connection between the optical component and the cable remains intact.*

*8. The connector of claim 7, wherein one of the threaded members is driftlessly connected in an axial relationship with the cable mounting structure.*

*9. The connector of claim 8, wherein the cable mounting structure and one of the mating threaded mounting structures are integral with each other.*

*10. The connector of claim 8, wherein the threaded member driftlessly connected to the cable mounting structure extends through the component mounting structure along the axis of the cable.*

*11. The connector of claim 7, wherein the large compression spring is arranged in opposition between the cable mounting structure and the component mounting structure to reduce drift of the cable mounting structure relative to the optical component.*

*12. The connector of claim 7, further comprising a releasable lock arranged to positively fix the adjusted distance between the cable mounting structure and the optical component by releasably locking the relative rotation of the threaded members.*

*13. The connector of claim 7, wherein the threaded members are mated at at least 100 threads to the inch.*

*14. The connector of claim 13, wherein the threaded members are mated at at least 200 threads to the inch.*

*15. The connector of claim 7, further comprising a key protruding from the cable mounting structure for engagement with an anti-twist slot.*

*16. The connector of claim 7, wherein the cable mounting structure includes a ferrule.*

*17. The connector of claim 16, wherein an end of the ferrule is beveled from a plane perpendicular to the axis.*

*18. The connector of claim 7, further comprising a key protruding from the cable mounting structure for engagement with an anti-twist slot.*

*19. The connector of claim 7, wherein the component mounting structure comprises a standard quick-connect fitting designed to affix an optical component.*

*20. The connector of claim 19, wherein the quick-connect fitting is an ST-type coupling nut.*

*21. The connector of claim 7, further comprising diagonal knurls on one of the mating threaded members.*

*22. The connector of claim 7, wherein one of the mounting structures comprises a standard quick-connect fitting designed to affix an optical component.*

*23. The connector of claim 22, wherein the quick-connect fitting is an ST-type coupling nut.*

*24. The connector of claim 7, wherein the small compression spring is arranged to urge the cable mounting structure in opposition to force exerted between the mating threaded members.*

*25. A junction in a fiber optic network, comprising:*

*two fiber optic cables, signal arrival levels differing between the cables;*

*at least one of the cables being joined to the junction by a connector according to claim 7, an attenuation provided by the connector being calibrated so that signals provided to the junction from the cables have relatively similar levels.*

*26. A connector, comprising:*

*a coupling nut designed to affix an optical component, said coupling nut containing a small compression spring and a large compression spring;*

*a cable mounting structure designed to retain an end of a fiber optic cable in an optical alignment with the optical component, the cable mounting structure being connected in an essentially driftless axial relationship with a threaded member; and*

*an adjuster member threaded with the threaded member and axially coupled to the coupling nut, the adjuster adapted to adjust an axial position of the cable mounting structure relative to the coupling nut by relative rotation of the adjuster member and the threaded member while an optical connection between the optical component and the cable remains intact.*

*27. The connector of claim 26, wherein the small compression spring is arranged to urge the cable mounting structure in opposition to a force exerted by rotation of the adjuster member.*

*28. The connector of claim 27, wherein the cable mounting structure extends through the coupling nut along the axis of the cable.*

*29. The connector of claim 26, wherein the cable mounting structure and threaded member are integral with each other.*

*30. The connector of claim 26, further comprising a releasable lock arranged to positively fix the adjusted distance between the cable mounting structure and the optical component by releasably locking the relative rotation of the adjuster member and the threaded member.*

*31. The connector of claim 26, wherein the adjuster member and threaded member are mated at at least 100 threads to the inch.*

*32. The connector of claim 26, wherein the adjuster member and threaded member are mated at at least 200 threads to the inch.*

*33. The connector of claim 26, further comprising a key protruding from the cable mounting structure for engagement with an anti-twist slot.*

*34. The connector of claim 26, wherein a terminal end of the cable mounting structure is beveled from a plane perpendicular to the axis.*

*35. The connector of claim 26, wherein the connecting nut comprises a standard quick-connect fitting.*

*36. The connector of claim 35, wherein the quick-connect fitting is an ST-type coupling nut.*

*37. A connector, comprising:*

*means for affixing an optical component;*

*a small compression spring and a large compression spring contained in the affixing means;*

*ferrule means to retain an end of a fiber optic cable in an optical alignment with the optical component; and*

*threaded means designed to adjust a distance between the cable end and the optical component by relative rotation of the threaded means, the distance being calibratable while an optical connection between the optical component and the cable remains intact.*

*38. The connector of claim 37, wherein the small compression spring is arranged to urge the ferrule means in opposition to a force exerted between the threaded means.*

*39. The connector of claim 37, wherein the ferrule means and one of the threaded means are integral with each other.*

*40. The connector of claim 37, wherein the affixing means comprises a standard quick-connect coupling nut.*

*41. The connector of claim 37, wherein the threaded means are mated at at least 200 threads to the inch.*

*42. The connector of claim 37, further comprising a key connected to the ferrule and radially protruding for engagement with an anti-twist slot.*

*43. The connector of claim 37, wherein a terminal end of the ferrule means is beveled from a plane perpendicular to the axis.*

*44. A fiber optic connection, comprising:*

*a component mounting structure designed to affix an optical component, said component mounting structure containing a small compression spring and a large compression spring;*

*a fiber optic cable having an end mounted in a ferrule, the end of the ferrule being beveled from a plane perpendicular to the axis; and*

*mating threaded members designed to adjust a distance between the cable end and the optical component by relative rotation of the threaded members without substantial disassembly of the connection.*

*45. The connection of claim 44, wherein back-reflection is reduced by a polish of the ferrule end.*

*46. The connection of claim 44, further comprising an anti-reflective coating on the ferrule end.*

*47. The connection of claim 44, further comprising a key joined to the ferrule and projecting radially for engagement with an anti-twist slot.*

*48. The connection of claim 44, wherein one of the component mounting structure comprises a standard quick-connect fitting designed to affix an optical component.*

*49. The connection of claim 48, wherein the quick-connect fitting is an ST-type coupling nut.*

*50. A junction in a fiber optic network, comprising:*

*two fiber optic cables, signal arrival levels differing between the cables;*

*at least one of the cables being joined to the junction by a connection according to claim 44, an attenuation provided by the connection being calibrated so that signals provided to the junction from the cables have relatively similar levels.*

*51. A connector, comprising:*

*a cable mounting structure designed to retain an end of a fiber optic cable;*

*a standard quick-connect fitting designed to affix an optical component, said quick-connect fitting containing a small compression spring and a large compression spring; and*

*mating threaded members designed to cooperate with the mounting structure and quick-connect fitting to retain the cable mounting structure on an axial alignment with the optical component at a distance adjustable by relative rotation of the threaded members.*

*52. The connector of claim 51, wherein the quick-connect fitting is an ST-type coupling nut.*

*53. The connector of claim 51, further comprising diagonal knurls on one of the mating threaded members.*

*54. The connector of claim 51, further comprising a key protruding from the cable mounting structure for engagement with an anti-twist slot.*

*55. The connector of claim 51, further comprising twist relief to maintain an angular orientation of the ferrule face, without inducing twist into the optical cable.*

*56. The connector of claim 51, wherein one of the threaded members is driftlessly connected in an axial relationship with the cable mounting structure.*

*57. The connector of claim 56, wherein the cable mounting structure and one of the mating threaded mounting structures are integral with each other.*

*58. The connector of claim 56, wherein the threaded member driftlessly connected to the cable mounting structure extends through the quick-connect fitting along the axis of the cable.*

*59. The connector of claim 51, further comprising a spring arranged in opposition between the cable mounting structure and one of the mating threaded members to reduce drift of the cable mounting structure relative to the optical component.*

*60. The connector of claim 51, further comprising a releasable lock arranged to positively fix the adjusted distance between the cable mounting structure and the optical component by releasably locking the relative rotation of the threaded members.*

*61. The connector of claim 51, wherein the threaded members are mated at at least 100 threads to the inch.*

*62. The connector of claim 61, wherein the threaded members are mated at at least 200 threads to the inch.*

*63. The connector of claim 51, wherein the cable mounting structure includes a ferrule.*

*64. The connector of claim 63, an end of the ferrule being beveled at least seven degrees from perpendicular to an optical axis of the cable.*

*65. The connector of claim 63, wherein back-reflection is reduced by a polish of the ferrule end.*

*66. The connector of claim 63, further comprising an anti-reflective coating on the ferrule end.*

*67. A junction in a fiber optic network, comprising:*

*two fiber optic cables, signal arrival levels differing between the cables;*

*at least one of the cables being joined to the junction by a connector according to claim 51, an attenuation provided by the connector being calibrated so that signals provided to the junction from the cables have relatively similar levels.*

*68. A method, comprising:*

*connecting two fiber optic cables to a common optical device, the cables having differing signal arrival levels, at least one of the cables being joined to the junction by a connector according to claim 51, an attenuation provided by the connector being calibrated so that signals arrive on the cables at relatively similar levels.*

*69. A connector, comprising:*

*means for retaining an end of a fiber optic cable;*

*a standard quick-connect fitting designed to affix an optical component, said quick-connect fitting containing a small compression spring and a large compression spring; and*

*aligning means for retaining the fiber optic cable and optical component in an optical alignment, and for adjusting an axial distance between the cable end and the optical component.*

*70. The connector of claim 69, wherein the quick-connect fitting is an ST-type coupling nut.*

*71. The connector of claim 69, further comprising twist relief means to maintain an angular orientation of the ferrule face, without inducing twist into the optical cable.*

*72. The connector of claim 69, further comprising biasing means to effect a driftless axial coupling between the cable retaining means and the alignment means.*

*73. The connector of claim 69, wherein the cable retaining means and one component of the aligning means are integral with each other.*

*74. The connector of claim 69, further comprising biasing means arranged to reduce drift during adjustment of the aligning means of the cable retaining means relative to the optical component.*

*75. The connector of claim 69, further comprising a releasable lock arranged to positively fix the adjusted distance between the cable retaining means and the optical component by releasably locking the relative motion of components of the alignment means.*

*76. The connector of claim 69, wherein the aligning means includes threaded members mated at at least 100 threads to the inch.*

*77. The connector of claim 76, wherein the threaded members are mated at at least 200 threads to the inch.*

*78. The connector of claim 69, wherein the cable retaining means includes a ferrule.*

*79. The connector of claim 78, an end of the ferrule being beveled at least seven degrees from perpendicular to an optical axis of the cable.*

*80. A connector, comprising:*

*a ferrule retaining an end of a fiber optic cable;*

*a standard quick-connect coupling nut designed to affix an optical component, said quick-connect coupling nut containing a small compression spring and a large compression spring;*

*a first threaded member, stably axially coupled to the quick-connect coupling nut; and*

*a second member threaded with the first threaded member and stably axially coupled to the ferrule, the first and second threaded members retaining the cable end on an optical alignment with the optical component, the second axial coupling allowing free relative rotation of the threaded members without substantial disassembly of the connection.*

*81. The connector of claim 80, wherein the quick-connect coupling nut is an ST-type coupling nut.*

* * * * *